United States Patent
Gong

(10) Patent No.: US 8,750,950 B2
(45) Date of Patent: Jun. 10, 2014

(54) COMMUNICATION DEVICE

(75) Inventor: Yigang Gong, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 78 days.

(21) Appl. No.: 13/391,447

(22) PCT Filed: Sep. 17, 2009

(86) PCT No.: PCT/CN2009/074004
§ 371 (c)(1),
(2), (4) Date: Feb. 21, 2012

(87) PCT Pub. No.: WO2011/032313
PCT Pub. Date: Mar. 24, 2011

(65) Prior Publication Data
US 2012/0165083 A1 Jun. 28, 2012

(51) Int. Cl.
*H04M 1/00* (2006.01)

(52) U.S. Cl.
USPC ............... 455/575.8; 455/90.3; 455/550.1; 455/575.1; 455/575.3; 455/575.5; 379/388.01; 379/420.01; 379/428.01; 379/429; 379/433.01

(58) Field of Classification Search
USPC ............ 455/90.3, 550.1, 575.1, 575.3, 575.5, 455/575.8; 379/388, 420, 428.01, 429, 433
See application file for complete search history.

(56) References Cited

U.S. PATENT DOCUMENTS

| | | | |
|---|---|---|---|
| 4,225,970 A * | 9/1980 | Jaramillo et al. | 455/90.3 |
| 4,719,322 A | 1/1988 | Guzik et al. | |
| 5,721,787 A | 2/1998 | Neilaur et al. | |
| 6,983,130 B2 * | 1/2006 | Chien et al. | 455/90.3 |
| 6,996,425 B2 * | 2/2006 | Watanabe | 455/575.1 |
| 7,548,761 B2 * | 6/2009 | Strawn et al. | 455/550.1 |
| 7,869,839 B2 * | 1/2011 | Jung | 455/575.1 |

(Continued)

FOREIGN PATENT DOCUMENTS

| | | |
|---|---|---|
| CN | 201042062 Y | 3/2008 |
| CN | 201188291 Y | 1/2009 |

(Continued)

OTHER PUBLICATIONS

International Search Report datd Jun. 24, 2010 from corresponding International Application No. PCT/CN2009/074004.
Extended European Search Report dated Nov. 13, 2013 from corresponding European Application No. 09849366.

*Primary Examiner* — Steve D Agosta
(74) *Attorney, Agent, or Firm* — Wolf, Greenfield & Sacks, P.C.

(57) ABSTRACT

A communication device includes an upper housing and a bottom housing connected to each other, a master Printed Circuit Board (PCB) for realizing a communication function, a speaker and a keypad assembly. The master PCB board is arranged on the bottom housing, wherein the upper housing includes a front housing and a front cover, the keypad assembly is arranged between the front housing and the front cover; the speaker is arranged under the front housing, the keypad assembly is connected to the master PCB board by a flexible circuit board which passes through the front housing; voice spreading holes connecting to the front cavity of the speaker are correspondingly arranged on the front cover, the keypad assembly and the front housing; the joints among the front housing, the keypad assembly, the front cover and the speaker are waterproof.

4 Claims, 4 Drawing Sheets

(56) References Cited

U.S. PATENT DOCUMENTS

| | | | |
|---|---|---|---|
| 7,941,196 B2* | 5/2011 | Kawasaki et al. | 455/575.8 |
| 8,255,019 B2* | 8/2012 | Hayashi et al. | 455/575.1 |
| 2007/0074473 A1* | 4/2007 | Yamaguchi et al. | 52/302.1 |
| 2009/0191927 A1* | 7/2009 | Hong | 455/575.8 |

FOREIGN PATENT DOCUMENTS

| | | |
|---|---|---|
| CN | 101527742 A | 9/2009 |
| JP | 2006033203 | 2/2006 |
| JP | 2007027810 A | 2/2007 |
| JP | 2009187893 A | 8/2009 |

* cited by examiner

COMMUNICATION DEVICE

FIELD OF THE INVENTION

The present invention relates to the field of communication device, and in particular to design of waterproof structure for a hand-held communication device.

BACKGROUND OF THE INVENTION

With miniaturization of communication devices, how to arrange a speaker in limited space and ensure the speaker's good sound quality becomes a primary concern in design of the communication devices. Moreover, for a professional user, waterproof function has become necessary for a communication device. In order to achieve good voice spreading effect, a hole which has an area no less than 20% of the area of the speaker should be arranged on the keypad assembly. The bigger the hole area is, the better the sound effect becomes, whereas the harder the waterproof becomes.

As shown in FIG. 2, a communication device in the prior art generally includes a front housing 103, a keypad assembly 104, a speaker 102, a middle housing 107, a master Printed Circuit Board (PCB) 106 and a back housing 105, the speaker 102 being arranged directly below the keypad assembly 104, and the speaker 102 and the keypad assembly 104 being arranged between the front housing 103 and the middle housing 107. As shown in FIG. 1, the voice spreading hole 101 of the speaker is arranged inside a digital character input keypad area of the front housing 103, and the size of the voice spreading hole 101 is limited by the size of this keypad area. Moreover, the keypad assembly 104 is directly in contact with the speaker 102, and the waterproof design can only be carried out for the keypad assembly 104. Mesh fabric and the like are usually employed for the keypad assembly 104 to implement basic waterproof and dustproof treatment, with a waterproof level of IPX4.

According to the above solution in the prior art, during the assembly, a traditional back assembly is required. However, the efficiency of the assembly is not high enough, and First Pass Yields with regarding voice and waterproof are both difficult to be improved.

Another solution is to arrange the speaker at a part of the front housing located over the screen to completely separate the speaker away from a keypad assembly and to perform the waterproof design separately. However, this solution may lead to an increase of the overall volume of the device and hence the device is not convenient for carrying and using. Therefore, there is need for improvement and enhancement.

SUMMARY OF THE INVENTION

In view of the above-described defects in the prior art, the technical problem to be solved by the present invention is to provide a communication device structure which can effectively enhance overall waterproof performance and is more convenient and quick to assemble.

The technical solution employed by the invention to solve the technical problem thereof is as follows:
configuring a communication device comprising an upper housing and a lower housing connected to each other, a master Printed Circuit Board (PCB) for realizing a communication function, a speaker and a keypad assembly, the master PCB being arranged on the lower housing, wherein the upper housing includes a front housing and a front cover, and the keypad assembly is arranged between the front housing and the front cover;
the speaker is arranged under the front housing, the keypad assembly is connected to the master PCB by a flexible circuit board passing through the front housing;
a voice spreading hole connecting to a front cavity of the speaker is correspondingly arranged on the front cover, the keypad assembly and the front housing;
the joints among the front housing, the keypad assembly, the front cover and the speaker are sealed.

In the communication device according to the invention, the keypad assembly includes a keypad and a keypad PCB, a waterproof layer is provided between the keypad and the keypad PCB, adhesive is provided between the keypad, the keypad assembly and the waterproof layer to seal.

In the communication device according to the invention, a water guiding groove is provided on the front housing. The water guiding groove has the leading end connected to the front cavity of the speaker, and the trailing end connected to the joint between the upper housing and the lower housing, which is used to guide out the water permeating into the front cavity of the speaker under gravity.

In the communication device according to the invention, a voice transmission hole is provided on an area of the front housing and the keypad PCB that are corresponding to a digital character input keypad area. The voice transmission hole is used for making the voice from the speaker form a backflow under the keypad in order to prevent the formation of echo.

In the communication device according to the invention, a function option keypad area and a digital character input keypad area are provided on the front cover, the voice spreading hole on the front cover is provided between the function option keypad area and the digital character input keypad area, and the voice spreading holes on the front housing and the keypad assembly are provided at a position corresponding to the voice spreading hole on the front cover.

In the communication device according to the invention, the waterproof layer includes an adhesive film and a mesh fabric, wherein the adhesive film is adhered to the keypad PCB and the mesh fabric is provided between the adhesive film and the keypad.

The invention separates the keypad PCB from the speaker with the front housing by altering the structure of the upper housing of communication device, which is convenient for the waterproofing process. Moreover, the timely draining design is arranged on the front housing to prevent a long-term accumulation of water in the front cavity from affecting sound effect. At the same time, the application of waterproof means such as traditional mesh fabric waterproofing prevents the entry of water and dust so that the overall waterproof performance is effectively improved. It is verified that a waterproof level of IP67 can be reached.

BRIEF DESCRIPTION OF THE DRAWINGS

The invention will be further described hereinafter with reference to the accompanying figures and embodiments thereof, wherein.

DETAILED DESCRIPTION OF THE INVENTION

A preferred embodiment of the invention will be descried in detail hereinafter with reference to the drawings.

Figure 1:
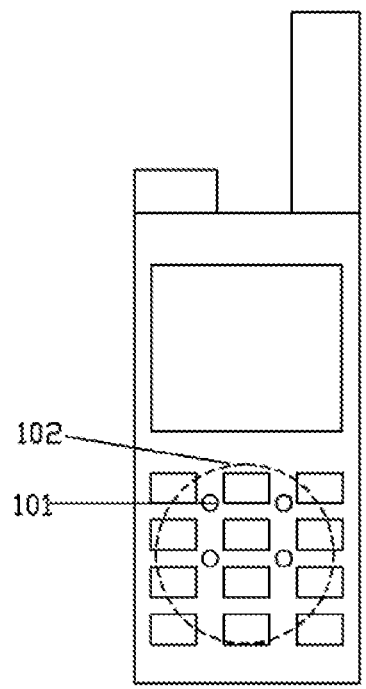
FIG. 1 is a front view of a communication device in the prior art.
Figure 2:
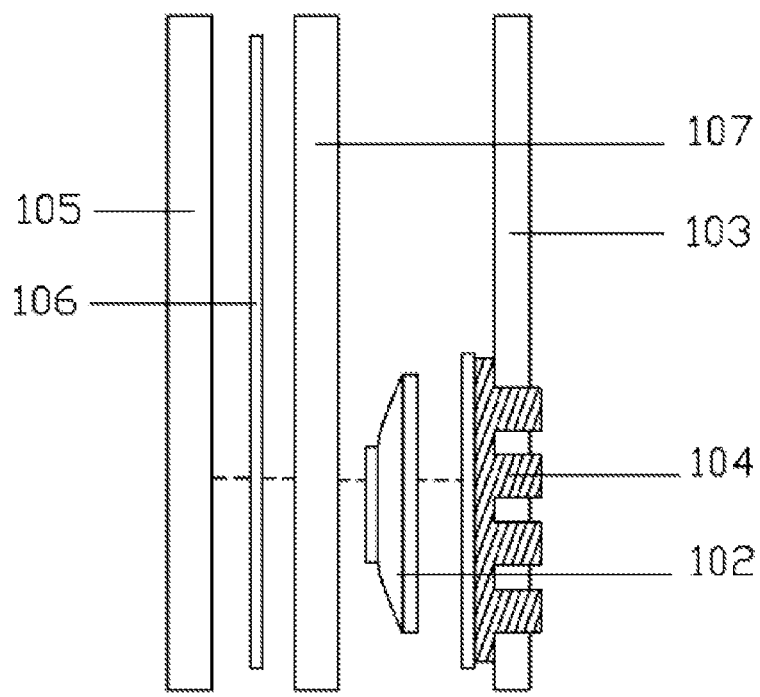
FIG. 2 is an assembling structure view of the communication device in the prior art.

The communication device according to the embodiment of the invention includes an upper housing and a lower housing connected to each other, a master Printed Circuit Board (PCB) for realizing a communication function, a speaker and a keypad assembly, wherein the master PCB is arranged on the lower housing. The various drawings of the embodiment mostly depict the upper housing, the assembly view between the lower housing and the master PCB and the assembly view between the speaker and the master PCB can be seen in FIG. 2.

Figure 3:
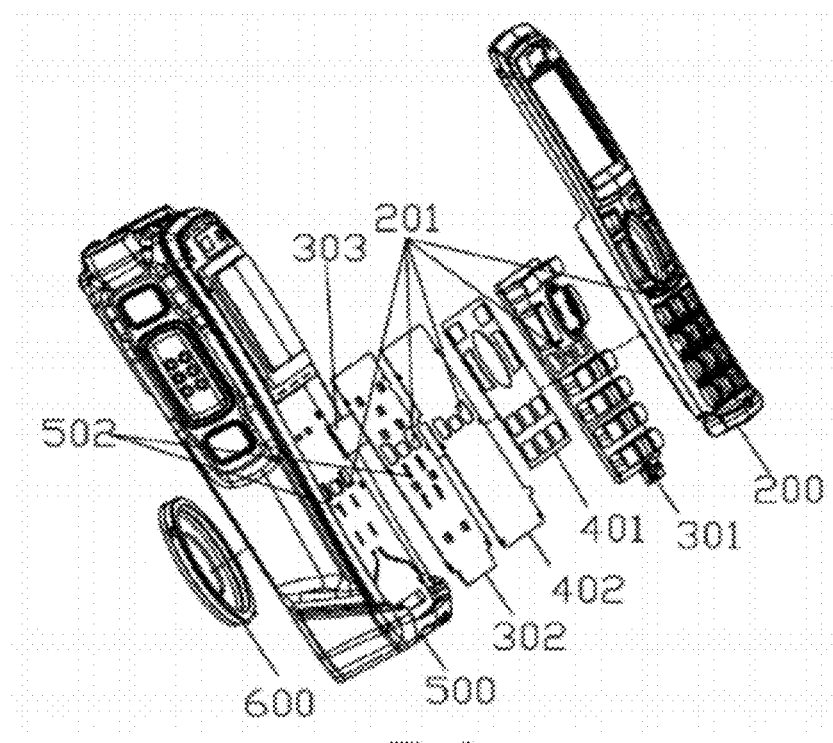
FIG. 3 is an assembling structure view of a speaker and an upper housing of the communication device according to an embodiment of the invention.
Figure 5:
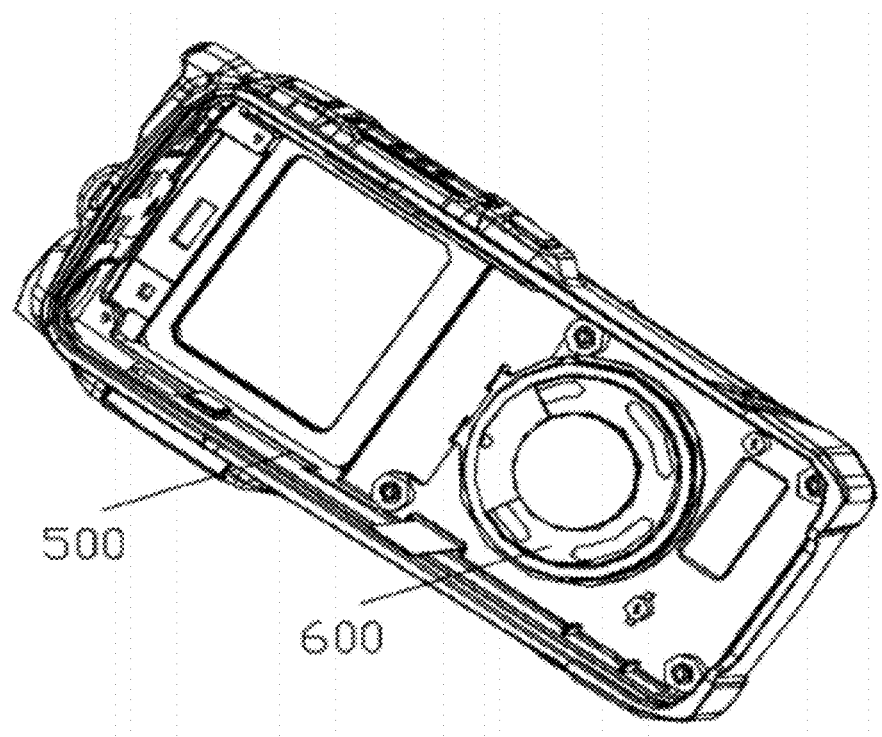
FIG. 5 is a back structure view of a front housing of the communication device installed with the speaker according to the embodiment of the invention.

As shown in FIG. 3, the upper housing includes a front housing 500 and a front cover 200, the keypad assembly being provided between the front housing 500 and the front cover 200. The keypad assembly includes a keypad 301 and a keypad PCB 302. A speaker 600 is provided under the front housing 500, and a connecting hole 501 is provided on the front housing 500, and the keypad assembly is connected to the master PCB by flexible circuit board 303 passing through the connecting hole 501 on the front housing. As shown in FIG. 5, the speaker is connected to the back surface of the front housing 500 by adhesive, and the connecting hole 501 on the front housing 500 is also sealed by adhesive after the flexible circuit board 303 passing through. Voice spreading holes 201 connecting to a front cavity of the speaker are correspondingly arranged on the front cover 200, the keypad assembly and the front housing 500. The joints among the front housing 500, the keypad assembly, the front cover 200 and the speaker 600 are sealed.

By separating the upper housing into a front housing 500 and a front cover 200, the connecting point between the keypad PCB 302 and the master PCB can be minimized so as to facilitate sealing, and the waterproof design between the keypad assembly portion and the master PCB is made easier.

It is noted that in the embodiment, the holes provided in various layers from the front housing 500 to the front cavity of the speaker 600 are connected from outside to inside and all collectively referred to as voice spreading holes 201. The voice spreading holes are discriminated from each other in accordance with the different layers at which they are located.

Figure 6:
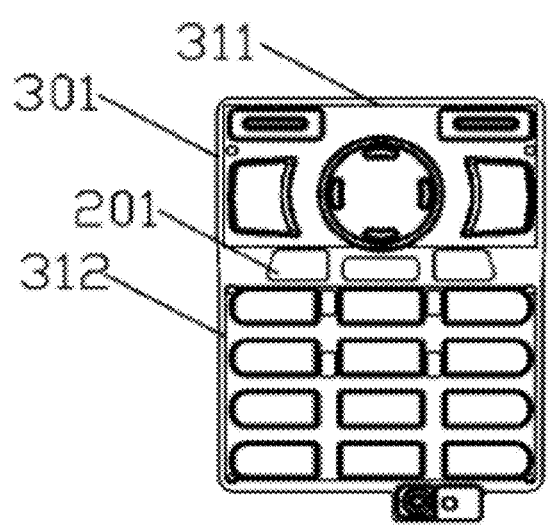
FIG. 6 is a front schematic view of the keypad according to the embodiment of the invention.
Figure 7:
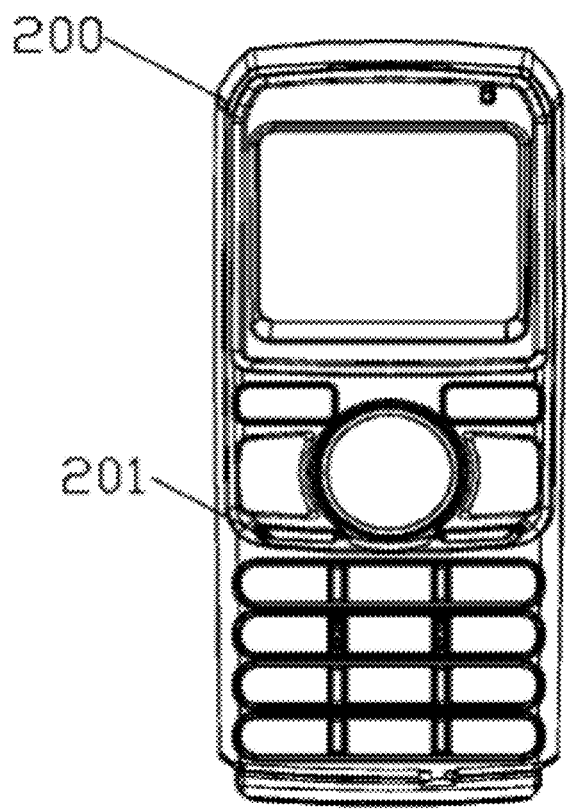
FIG. 7 is a front schematic view of the front cover according to the embodiment of the invention.

In this embodiment, as shown in FIG. 6, the keypad 301 includes a function option keypad area 311 and a digital character input keypad area 312, and the function option keypad area 311 and the digital character input keypad area 312 are correspondingly provided on the front cover, as shown in FIG. 7. When in use, the keypad 301 can directly cover corresponding positions of the front cover 200. The voice spreading holes 201 on the front cover 200 are arranged between the function option keypad area 311 and the digital character input keypad area 312; the voice spreading holes on the front housing 500 and the keypad assembly are arranged at positions that correspond to the voice spreading holes on the front cover 200. In this way, the area can be used fully, and larger voice spreading holes can be provided on the front cover; besides, it is only required to provide adhesives between the keypad 301 and the keypad PCB 302 to realize sealing so as to improve the sound effect and waterproof performance of the communication device effectively, without special waterproof treatment for the keypad portion.

In this embodiment, a waterproof layer is provided between the keypad 301 and the keypad PCB 302, and adhesives are provided between the keypad 301, the keypad PCB 302 and the waterproof layer to seal. Specifically, the waterproof layer may include an adhesive film 402 and a mesh fabric 401, wherein the adhesive film 402 is adhered on the keypad PCB 302 and the mesh fabric 401 is provided between the adhesive film 402 and the keypad 301. The adhesive film 402 performs waterproof function for the keypad PCB 302. The mesh fabric 401 can isolate foreign dust while ensuring acoustic conductance, and can perform the basic waterproof function. The front cover 200 and the keypad 301, after fitted with each other, just snap with the front cover 500 so as to fit the keypad 301 and other keypad assemblies and then fit the front housing 500 and front cover 200 by ultrasound. The waterproof layer can also be formed by other waterproof materials.

Figure 4:
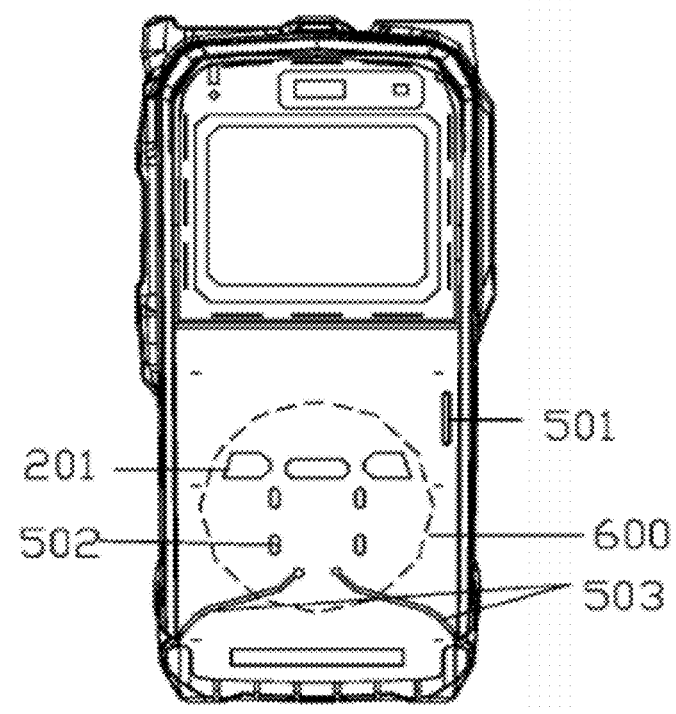
FIG. 4 is a front structure view of a front housing of the communication device according to the embodiment of the invention.

In order to deal with the situation of entry of massive water and to prevent a long-term accumulation of water in the front cavity from affecting sound effect, a water guiding groove 503 is provided on the front housing 50. As shown in FIG. 4, the leading end of the water guiding groove 503 is connected to the front cavity of the speaker 600, and the trailing end thereof is connected to the joint between the upper housing and the lower housing of the communication device. When massive water enters the front cavity of the speaker, the communication device can be erected so that the water can be discharged along the water guiding groove from the bottom of the handheld communication device under gravity.

Since the sounding area of the speaker 600 is relatively large and the voice spreading holes 201 are relatively small, especially no voice spreading hole 201 is provided in the digital character input keypad area 312, sound made by the speaker will be blocked by this portion of keypad and form an echo inside the device. Therefore, voice transmission holes 502 are also provided on an area of the front housing 500, the keypad PCB 302 and the waterproof layer that are corresponding to this portion of keypad so that sound made by the speaker can form a backflow under the keypad to prevent the formation of echo and improve the voice quality of communication. The number of the voice transmission holes 502 can be 4. The voice transmission holes 502 are arranged in a rectangular shape at corresponding positions on the keypad PCB and the front housing so as to ensure an even voice transmission. If the number of transmission holes is too small, the expected effect may not be achieved; if the number is too large, it will influence the overall structure of the front housing and the keypad PCB so that they will easily get deformed.

In this embodiment, the number of voice spreading holes on the front cover 200, the keypad assembly and the front housing 500 is preferably 3. These holes are respectively connected to the front cavity of the speaker from the front cover 200 and are arranged on various layers in a line. On one hand, the sound guiding effect is ensured; on the other hand, it can be ensured that water entering the front cavity of the speaker will sufficiently flow out. When there is water entering the front cavity, the speaker and the master PCB on the lower housing will not be affected since a seal is provided between the front cavity and the rear cavity of the speaker; meanwhile, the water can be directly discharged through the connected voice spreading holes.

During the manufacture and assembly, a front assembly manner can be adopted, namely, after the internal elements such as the speaker are assembled inside the front housing, the keypad assembly is assembled on the front housing, and then the front cover is assembled on the keypad. The joints among various components are made waterproof by adhesive, and the front housing and the front cover are fixed by ultrasound to improve the productivity and waterproof First Pass Yield.

The invention separates the keypad PCB from the speaker with the front cover by altering the structure of the upper housing of communication device, which is convenient for the waterproofing process. Moreover, the timely draining design on the front housing can prevent a long-term accumulation of water in the front cavity of the speaker from affecting sound effect. At the same time, the application of waterproof means such as traditional mesh fabric waterproof prevents the entry of water and dust so that the overall waterproof performance is effectively improved. It is verified that a waterproof level of IP67 can be reached.

It will be understood that those skilled in the art can make modifications or changes in accordance with the above description, which also fall within the scope of protection defined by the appended claims of the invention.

The invention claimed is:

1. A communication device comprising:
    a first housing and a second housing connected to each other;
    a master Printed Circuit Board (PCB) for realizing a communication function and arranged on the second housing;
    a speaker; and
    a keypad assembly; wherein:
        the first housing comprises a front housing and a front cover;
        the keypad assembly is arranged between the front housing and the front cover, wherein the keypad assembly comprises a keypad and a keypad PCB, a waterproof layer is provided between the keypad and the keypad PCB, and adhesive is provided between the keypad, the keypad assembly and the waterproof layer to seal;
        the speaker is arranged in the second housing that is separate from the first housing;
        the keypad assembly is connected to the master PCB by a flexible circuit board passing through the front housing;
        a voice spreading hole connecting to a front cavity of the speaker is correspondingly arranged on the front cover, the keypad assembly and the front housing;
    joints among the front housing, the keypad assembly, the front cover and the speaker are sealed; and
        wherein a voice transmission hole is provided on an area of the front housing and the keypad PCB that are corresponding to the digital character input keypad area for making the voice from the speaker form a backflow under the keypad in order to prevent the formation of echo.

2. The communication device according to claim 1, wherein a water guiding groove is provided on the front housing, the water guiding groove has a leading end connected to the front cavity of the speaker and a trailing end connected to a joint between the first housing and the second housing, which is used to guide out the water permeating into the front cavity of the speaker under gravity.

3. The communication device according to claim 1, wherein a function option keypad area and a digital character input keypad area are provided on the front cover, the voice spreading hole on the front cover is provided between the function option keypad area and the digital character input keypad area, and the voice spreading holes on the front housing and the keypad assembly are provided at a position corresponding to the voice spreading hole on the front cover.

4. The communication device according to claim 1, wherein the waterproof layer includes an adhesive film and a mesh fabric, the adhesive film is adhered to the keypad PCB and the mesh fabric is provided between the adhesive film and the keypad.

\* \* \* \* \*